US012598640B2

(12) United States Patent
Dai et al.

(10) Patent No.: US 12,598,640 B2
(45) Date of Patent: Apr. 7, 2026

(54) USER EQUIPMENT TO OBJECT ASSOCIATION BEAM MANAGEMENT

(71) Applicant: QUALCOMM Incorporated, San Diego, CA (US)

(72) Inventors: Yucheng Dai, San Diego, CA (US); Wooseok Nam, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 487 days.

(21) Appl. No.: 18/069,184

(22) Filed: Dec. 20, 2022

(65) Prior Publication Data

US 2024/0205963 A1 Jun. 20, 2024

(51) Int. Cl.
*H04W 74/0808* (2024.01)
*H04L 5/00* (2006.01)
*H04W 16/28* (2009.01)

(52) U.S. Cl.
CPC ....... *H04W 74/0808* (2013.01); *H04L 5/0051* (2013.01); *H04W 16/28* (2013.01)

(58) Field of Classification Search
CPC . H04W 74/0808; H04W 16/28; H04W 76/19; H04L 5/0051; H04L 5/0048; G01S 13/003; G01S 13/424; G01S 13/878; H04B 7/0695; H04B 17/328; H04B 7/0617
See application file for complete search history.

(56) References Cited

U.S. PATENT DOCUMENTS

| 2020/0322771 A1 | 10/2020 | Izraeli et al. |
| 2020/0383167 A1 | 12/2020 | Sengupta et al. |
| 2021/0076417 A1 | 3/2021 | Bayesteh et al. |

OTHER PUBLICATIONS

International Search Report and Written Opinion—PCT/US2023/082523—ISA/EPO—Aug. 12, 2024.
Partial International Search Report—PCT/US2023/082523—ISA/EPO—Apr. 17, 2024.

*Primary Examiner* — Eric Myers
(74) *Attorney, Agent, or Firm* — QUALCOMM Incorporated

(57) ABSTRACT

A user equipment (UE) may receive at least one of a sensing signal for an object associated with the UE or of a channel state information (CSI) reference signal (CSI-RS) from a network node. The UE may transmit an indication of a broken association with the object based on at least one of the sensing signal or the CSI-RS. The UE may measure a strength of at least one of the sensing signal or the CSI-RS. The UE may measure at least one of a reference signal receive power (RSRP) or a relative RSRP backoff associated with at least one of the sensing signal or the CSI-RS. The UE may transmit the indication of the broken association in response to the measured strength of at least one of the sensing signal or the CSI-RS being less than or equal to a signal strength threshold value.

28 Claims, 13 Drawing Sheets

$\phi$ = Azimuth angle of departure (A-AoD)
$\theta$ = Zenith angle of departure (Z-AoD)
$\rho$ = Distance
$\phi'$ = Azimuth angle of arrival (A-AoA)
$\theta'$ = Zenith angle of arrival (Z-AoA)

transmitted signal reflected signal

802 receive at least one of a sensing signal for an object associated with the UE or of a CSI-RS from a network node

804 transmit an indication of a broken association with the object based on at least one of the sensing signal or the CSI-RS

800

1002 transmit a sensing signal to determine a location of an object associated with a UE 1004 receive a reflection of the sensing signal 1006 calculate the location of the object based on the received reflection of the sensing signal 1008 communicate with the UE based on the calculated location

1000

USER EQUIPMENT TO OBJECT ASSOCIATION BEAM MANAGEMENT

TECHNICAL FIELD

The present disclosure relates generally to communication systems, and more particularly, to a beam management system for user equipment (UE).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a user equipment (UE). The apparatus may receive at least one of a sensing signal for an object associated with the UE or of a channel state information (CSI) reference signal (CSI-RS) from a network node. The apparatus may transmit an indication of a broken association with the object based on at least one of the sensing signal or the CSI-RS.

In an aspect of the disclosure, a method, a computer-readable medium, and an apparatus are provided. The apparatus may include a network node. The apparatus may transmit a sensing signal to determine a location of an object associated with a UE. The apparatus may receive a reflection of the sensing signal. The apparatus may calculate the location of the object based on the received reflection of the sensing signal. The apparatus may communicate with the UE based on the calculated location.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
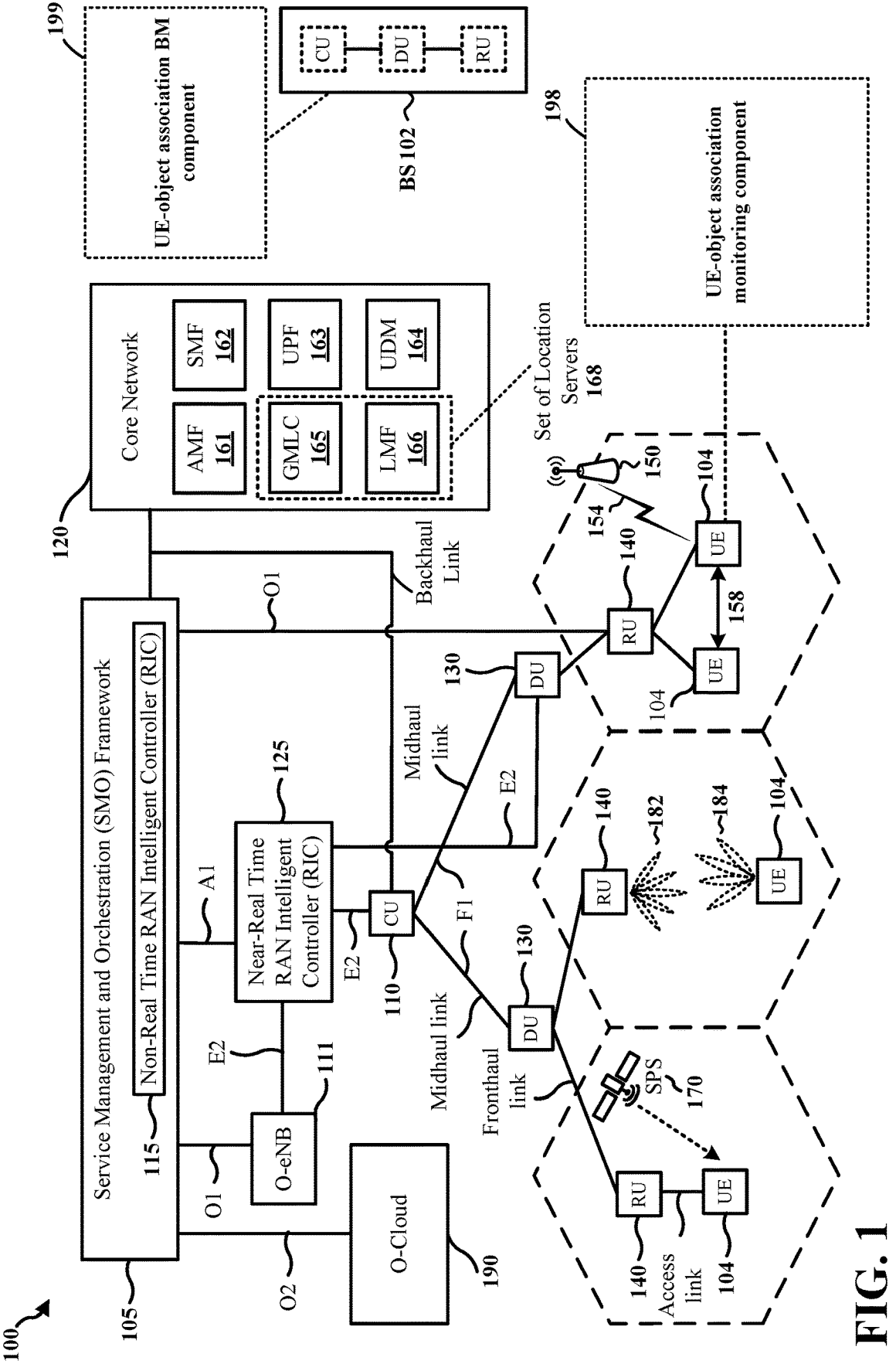
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media may include a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-cNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHZ-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR2-2 (52.6 GHZ-71 GHZ), FR4 (71 GHZ-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmission reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a UE-object association monitoring component 198 that may be configured to receive at least one of a sensing signal for an object associated with the UE or of a channel state information (CSI) reference signal (CSI-RS) from a network node. The UE-object association monitoring component 198 may be configured to transmit an indication of a broken association with the object based on at least one of the sensing signal or the CSI-RS. In certain aspects, the base station 102 may have a UE-object association beam management (BM) component 199 that may be configured to transmit a sensing signal to determine a location of an object associated with a UE. The UE-object association BM component 199 may be configured to receive a reflection of the sensing signal. The UE-object association BM component 199 may be configured to calculate the location of the object based on the received reflection of the sensing signal. The UE-object association BM component 199 may be configured to communicate with the UE based on the calculated location. Although the following description may be focused on association between UEs and target objects that may be sensed using wireless devices, the concepts described herein may be applicable to any wireless devices that may be associated with a target object, such as network nodes or road side units (RSUs). Although the following description may be focused on 5G NR, the concepts described herein may be applicable to other similar areas, such as LTE, LTE-A, CDMA, GSM, and other wireless technologies.

Figures 2A, 2B, 2C, 2D:
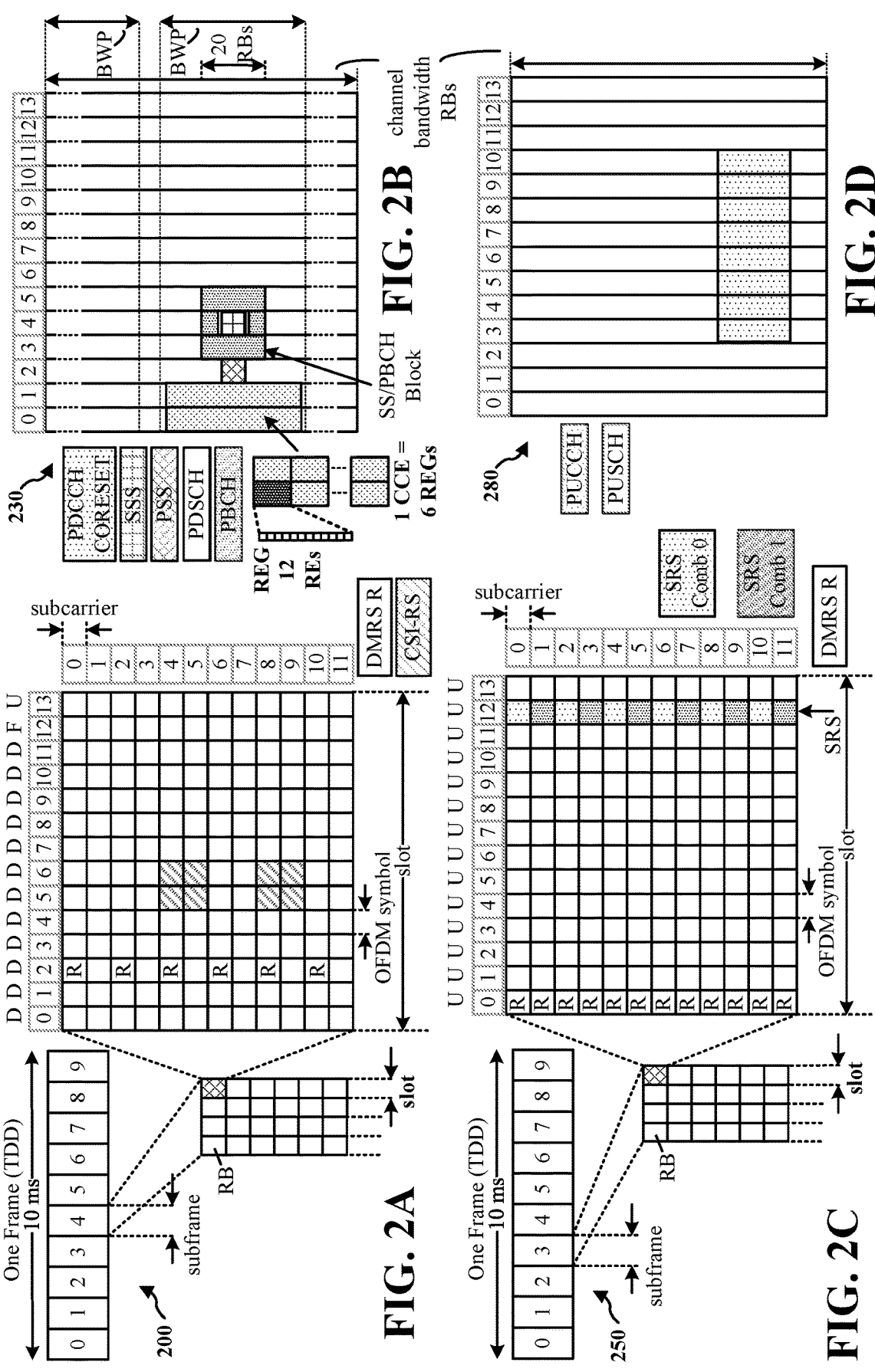
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| μ | SCS $\Delta f = 2^\mu \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^{\mu*15}$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
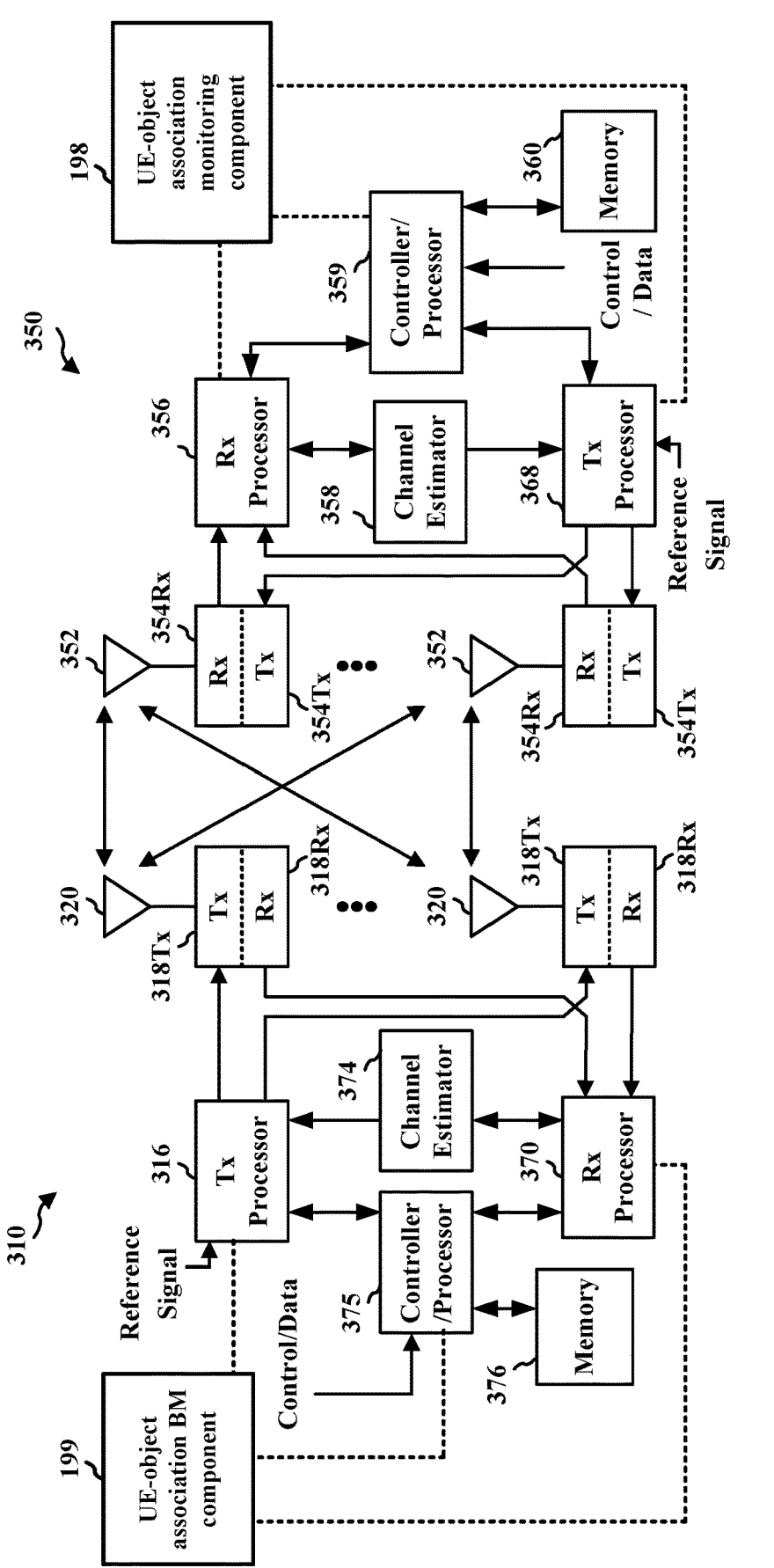
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the Tx processor 368, the Rx processor 356, and the controller/processor 359 may be configured to perform aspects in connection with the UE-object association component 198 of FIG. 1.

At least one of the Tx processor 316, the Rx processor 370, and the controller/processor 375 may be configured to perform aspects in connection with the UE-object association BM component 199 of FIG. 1.

Figure 4:
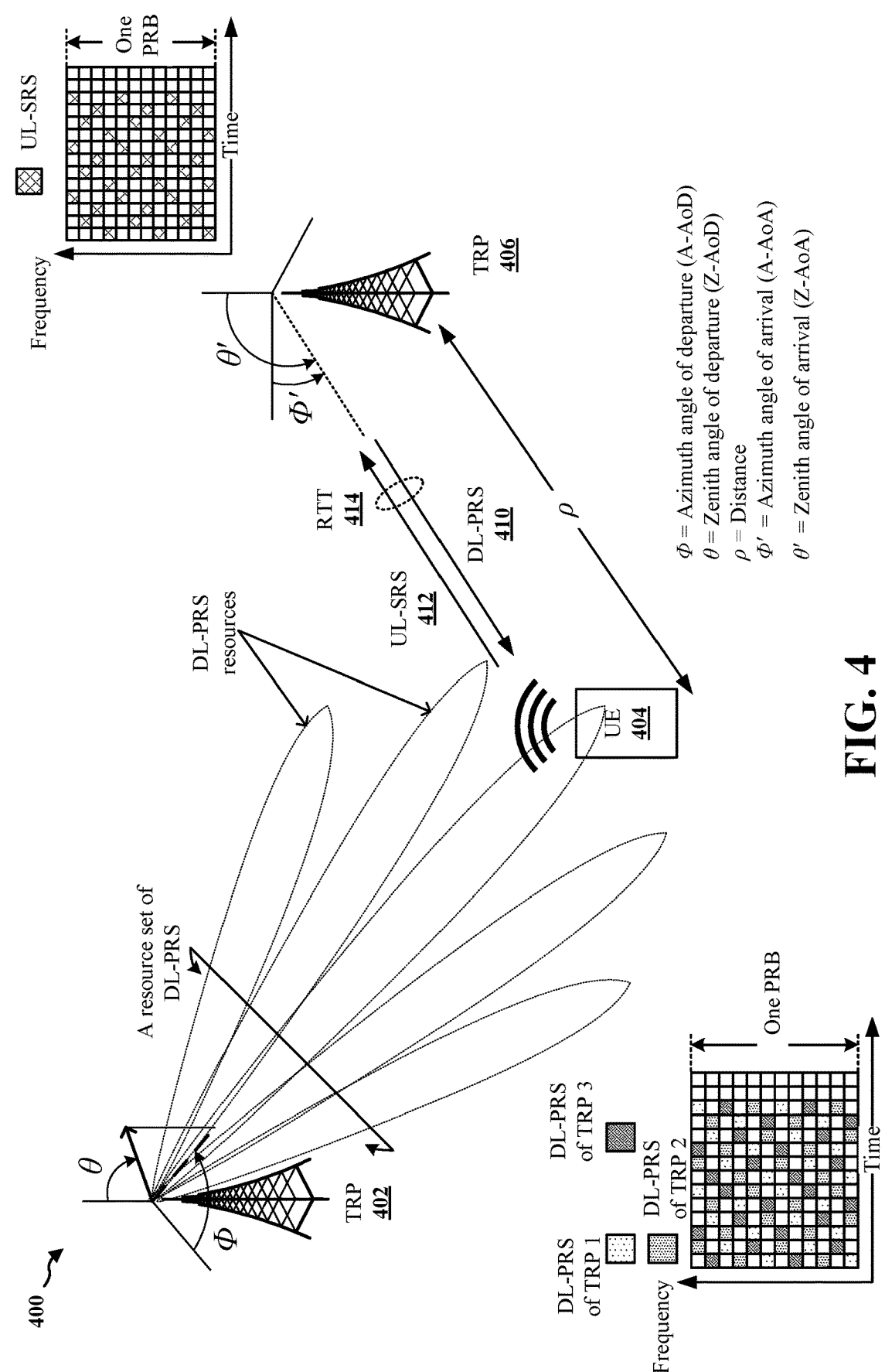
FIG. 4 is a diagram illustrating an example of a UE positioning based on reference signal measurements.

FIG. 4 is a diagram 400 illustrating an example of a UE positioning based on reference signal measurements. The UE 404 may transmit UL-SRS 412 at time $T_{SRS\_Tx}$ and receive DL positioning reference signals (PRS) (DL-PRS) 410 at time $T_{PRS\_Rx}$. The TRP 406 may receive the UL-SRS 412 at time $T_{SRS\_Rx}$ and transmit the DL-PRS 410 at time $T_{PRS\_Tx}$. The UE 404 may receive the DL-PRS 410 before transmitting the UL-SRS 412, or may transmit the UL-SRS 412 before receiving the DL-PRS 410. In both cases, a positioning server (e.g., location server(s)168) or the UE 404 may determine the RTT 414 based on $\|T_{SRS\_Rx}-T_{PRS\_Tx}\|-\|T_{SRS\_Tx}-T_{PRS\_Rx}\|$. Accordingly, multi-RTT positioning may make use of the UE Rx-Tx time difference measurements (i.e., $|T_{SRS\_Tx}-T_{PRS\_Rx}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_Rx}-T_{PRS\_Tx}|$) and UL-SRS-RSRP at multiple TRPs 402, 406 of uplink signals transmitted from UE 404. The UE 404 measures the UE Rx-Tx time difference measurements (and DL-PRS-RSRP of the received signals) using assistance data received from the positioning server, and the TRPs 402, 406 measure the gNB Rx-Tx time difference measurements (and UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and DL-PRS-RSRP) of downlink signals received from multiple TRPs 402, 406 at the UE 404. The UE 404 measures the DL RSTD (and DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and UL-SRS-RSRP) at multiple TRPs 402, 406 of uplink signals transmitted from UE 404. The TRPs 402, 406 measure the UL-RTOA (and UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Figure 5:
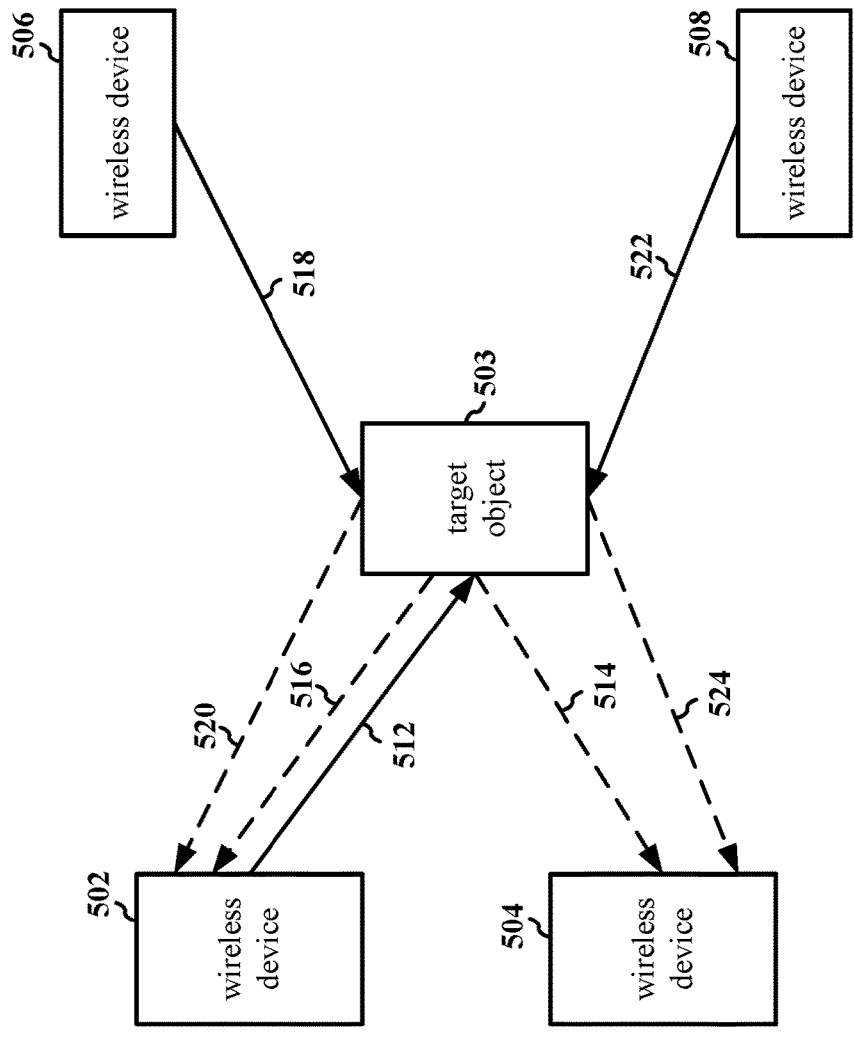
FIG. 5 is a diagram illustrating an example of sensing based on measurements of sensing signals reflected off of a target object, in accordance with various aspects of the present disclosure, in accordance with various aspects of the present disclosure.
Figure 5:

FIG. 5 is a diagram 500 illustrating an example of sensing based on sensing signal measurements. In one aspect, the wireless device 502 may perform monostatic sensing, where the wireless device 502 may transmit a set of sensing signals 512 at the target object 503, the target object 503 may reflect the set of sensing signals 512 as the reflected set of sensing signals 516 at the wireless device 502, and the wireless device 502 may measure the reflected set of sensing signals 516 from the target object 503. In another aspect, the wireless device 502 and the wireless device 504 may perform bistatic sensing, where the wireless device 502 may transmit a set of sensing signals 512 at the target object 503, the target object 503 may reflect the set of sensing signals 512 as the reflected set of sensing signals 514 at the wireless device 504, and the wireless device 504 may measure the reflected set of sensing signals 514 from the target object 503. In another aspect the wireless device 502 and the wireless device 506 may perform multi-static sensing, where in addition to the wireless device 502 measuring the reflected set of sensing signals 516 from the target object 503 using monostatic sensing, the wireless device 506 may transmit a set of sensing signals 518 at the target object 503, the target object 503 may reflect the set of sensing signals 518 as the reflected set of sensing signals 520 at the wireless device 502, and the wireless device 502 may measure the reflected set of sensing signals 520 from the target object 503. In another aspect the wireless device 502, the wireless device 504, and the wireless device 508 may perform multi-static sensing, where in addition to the wireless device 504 measuring the reflected set of sensing signals 514 from the target object 503 using bistatic sensing, the wireless device 508 may transmit a set of sensing signals 522 at the target object 503, the target object 503 may reflect the set of sensing signals 522 as the reflected set of sensing signals 524 at the wireless device 504, and the wireless device 504 may measure the reflected set of sensing signals 524 from the target object 503. Each wireless device may be any wireless device configured to transmit or receive wireless signals, such as UEs, network nodes, TRPs, or base stations. For example, the wireless device 502 may be a network node configured to transmit the set of sensing signals 512 at the target object 503 and measure the reflected set of sensing signals 516 from the target object 503. In another example, the wireless device 502 may be a network node configured to transmit the set of sensing signals 512 at the target object 503, and the wireless device 504 may be a UE configured to measure the reflected set of sensing signals 514 from the target object 503.

The wireless device 502 may conduct one or more sensing measurements on the reflected set of sensing signals 516 and/or the reflected set of sensing signals 520. In one aspect, the wireless device 502 may calculate a distance or a range between the wireless device 502 and the target object 503 based on a round trip time (RTT) between when the wireless device 502 transmits the set of sensing signals 512 and when the wireless device 502 receives the reflected set of sensing signals 516. In one aspect, the wireless device 502 may calculate a distance or a range that the set of sensing signals 518 and the reflected set of sensing signals 520 travels based on a time between when the wireless device 506 transmits the set of sensing signals 518 and when the wireless device 502 receives the reflected set of sensing signals 520. In one aspect, the wireless device 502 may calculate a location of the target object 503 based on a plurality or range or distance measurements, for example via triangulation using known positions of the wireless devices 502 and 506 and the calculated range or distance measurements. In one aspect, the wireless device 502 may calculate a velocity of the target object 503 based on a first calculated location of the target object 503 based on the reflected set of sensing signals 516 and/or the reflected set of sensing signals 520 measured at a first time, and a second calculated location of the target object 503 based on the reflected set of sensing signals 516 and/or the reflected set of sensing signals 520 measured at a second time. In one aspect, the wireless device 502 may calculate an AoA of the reflected set of sensing signals 516 and/or an AoD of the set of sensing signals 512 based on a plurality of ports that transmitted the set of sensing signals 512 and a plurality of ports that received the reflected set of sensing signals 516. In one aspect, the wireless device 502 may calculate an AoA of the reflected set of sensing signals 520 and/or an AoD of the set of sensing signals 518 based on a plurality of ports that transmitted the set of sensing signals 518 and a plurality of ports that received the reflected set of sensing signals 520.

Similarly, the wireless device 504 may conduct one or more sensing measurements on the reflected set of sensing signals 514 and/or the reflected set of sensing signals 524. In one aspect, the wireless device 504 may calculate a distance or a range that the set of sensing signals 512 and the reflected set of sensing signals 514 travels based on a on a time between when the wireless device 502 transmits the set of sensing signals 512 and when the wireless device 504 receives the reflected set of sensing signals 514. In one aspect, the wireless device 504 may calculate a distance or a range that the set of sensing signals 522 and the reflected set of sensing signals 524 travels based on a time between when the wireless device 508 transmits the set of sensing signals 522 and when the wireless device 504 receives the reflected set of sensing signals 524. In one aspect, the wireless device 504 may calculate a location of the target object 503 based on a plurality or range or distance measurements, for example via triangulation using the known positions of wireless devices 502, 504, and 508, and the calculated range or distance measurements. In one aspect, the wireless device 504 may calculate a velocity of the target object 503 based on a first calculated location of the target object 503 based on the reflected set of sensing signals 514 and/or the reflected set of sensing signals 524 measured at a first time, and a second calculated location of the target object 503 based on the reflected set of sensing signals 514 and/or the reflected set of sensing signals 524 measured at a second time. In one aspect, the wireless device 504 may calculate an AoA of the reflected set of sensing signals 514 and/or an AoD of the set of sensing signals 512 based on a plurality of ports that transmitted the set of sensing signals 512 and a plurality of ports that received the reflected set of sensing signals 514. In one aspect, the wireless device 504 may calculate an AoA of the reflected set of sensing signals 524 and/or an AoD of the set of sensing signals 522 based on a plurality of ports that transmitted the set of sensing signals 522 and a plurality of ports that received the reflected set of sensing signals 524. In order to perform Doppler estimates or velocity estimates of a target object, such as the target object 503 in FIG. 5, or of a UE, such as the UE 104 in FIG. 1, the receiver wireless node may be configured to measure a reflected set of sensing signals at multiple points of time.

In some aspects, a wireless device may use the measured sensing signals to generate a position profile of the target object 503. A position profile may include a plurality of attributes of the target object 503 related to its position, for example a location of the target object, a size of the target object, a shape of the target object, an orientation of the target object, a speed of the target object, a velocity of the target object, an acceleration of the target object, a Doppler effect of the target object, a gait of the target object, a routine of the target object, a gesture of the target object, a posture of the target object, a micro-Doppler profile of the target object, or a radar cross-section (RCS) of the target object. The wireless device may also measure non-RF wireless signals, such as temperature signals using a temperature sensor, audio signals using an audio sensor or microphone, or light signals using a light sensor or camera. A gait of a target object may be determined by measuring a periodic sequence of foot movements by an animal target object a minimum threshold number of times. A routine of a target object may be determined by measuring a periodic sequence of movements by a dynamic target object a minimum threshold number of times. A gesture of a target object may be determined by measuring a movement of a dynamic target object and comparing the movement to a library of known gestures. Such gesture libraries may include human activities, such as keystrokes on a surface or sign language gestures. A micro-Doppler profile of a target object may include a breathing rate based on expansion and contraction of the chest of a human target object, a heartbeat rate based on an audio signal from the heart of a human target object, or a rotation rate based on a speed of a fan blade of a motorized target object.

A network node or a UE configured to perform measurements on a set of reflected sensing signals may be configured to transmit a sensing signal report to a sensing server (e.g., an LMF) that coordinates a plurality of wireless nodes to perform sensing on a target object. Performing sensing on a target object, such as target object 503, may be viewed as a consumer-level radar with advanced detection capabilities, such as sensing both a position and a temperature of a target object. Configuring a network node to sense such attributes of a target object may be used for touchless or even device-free interaction with a device or system. The network node may use one or more RF signals as a sensing signal, allowing the wireless system to perform both communication and sensing with the same signal. For example, in a 3GPP NR wireless system, a network node may use a millimeter wave (mmWave) RF signal in the frequency range designations of FR2 (24.25 GHZ-52.6 GHZ), FR2x (52.6 GHZ-71 GHz), or FR4 (71 GHz-114.25 GHZ) to perform accurate range or distance detection of a target object.

In some aspects, a network node may be configured to detect and monitor an association or a relationship between a UE and an object that may be sensed by a wireless device. For example, a human being object may be holding a UE or may be wearing a container, such as clothing or a bag, that contains the UE. A human may carry a smartphone UE, may wear a smart watch UE, may wear a head-mounted display (HMD) UE, or may wear a backpack or carry a briefcase containing a notebook computer UE. In another example, a vehicle object may have a UE mounted on a surface of the vehicle. A vehicle may be a car, a drone, or an automated guided vehicle (AVG). A vehicle may have an infotainment system UE or an electronic control unit (ECU) UE mounted in the vehicle.

When an object is associated with a UE, a network node may sense the object and the object may be used as a proxy of the UE, or the network node may communicate with the UE and the UE may be used as a proxy of the target object. This allows the network node to track and manage both the UE and the object by communicating with the UE and not sensing the object, or by sensing the object and not communicating with the UE, thereby reducing overhead. A network node may be configured to make such an association permanent or temporary. The network node may sense one or more attributes of an object using one or more perception schemes.

In some aspects, the network node may detect a radar cross-section (RCS) of an object, a micro-Doppler profile of an object, a position of an object, or a temperature of an object. Such attributes may then be associated with a UE that is associated with the object. In one aspect, a network node may perform sensing on an object to assist in performing beam management (BM) on an associated UE or to assist in performing maximum permissible exposure (MPE) detection and/or mitigation on an associated UE. In some aspects, the network node may perform positioning (e.g., LTE positioning or NR positioning) with a UE, may perform sensing on the UE (e.g., if the UE is made of a material that reflects sensing signals better than the object), or more communicate with the UE (e.g., receive a report from a magnetometer or an accelerometer of the UE) to determine attributes of the UE. Such attributes may then be associated with an object that is associated with the UE. In some aspects, a set of UEs may be associated with a set of objects, and the network node may communicate with one of the UEs or may sense one of the objects/UEs to track the entire aggregate set of devices (UEs and objects). In some aspects, a network node may track a lost object or a lost UE by determining when an association between a UE and an object is broken (e.g., the UE is separated from the object by a minimum threshold distance). In some aspects, a UE-object association may be used to enhance public security by using a system that tracks less UEs and/or objects in an area of interest. In some aspects, a UE-object association may be used to track the health of an object (e.g., an elderly patient wearing or holding a UE), and transmit alerts to the UE if a monitored vital sign enters a dangerous threshold range, or trigger a communication between the UE and an emergency device if a monitored vital sign enters a dangerous threshold range.

A wireless device may be configured to transmit a request to associate a potential association user equipment (PAUE) with an object associated with an area of interest. A network node may receive the request and transmit an enquiry to a set of network nodes and a set of PAUEs to determine the capabilities of the set of network nodes and the capabilities of the set of PAUEs, respectively. The network node may then select a subset of the set of network nodes and a subset of the set of PAUEs as potential devices that may be used to create associations between a UE and an object. The network node may select the subsets based on the capabilities of the network nodes and PAUEs (e.g., capability of a network node to sense objects within an area of interest, capability of a PAUE to maintain an association with an object). The network node may be configured to transmit a set of data collection schedules to the subset of network nodes and the subset of PAUEs to obtain a first set of attributes associated with a UE and a second set of attributes associated with the object associated with the area of interest. The subset of PAUEs may include the UE. The network node may receive the first set of attributes and the second set of attributes from the subset of network nodes and the subset of UEs based on the set of data collection schedules. The network node may transmit an association of the UE with the object based on the first set of attributes and the second set of attributes. The wireless device may receive the association of the UE with the object associated with the area of interest based on the request.

Figure 6:
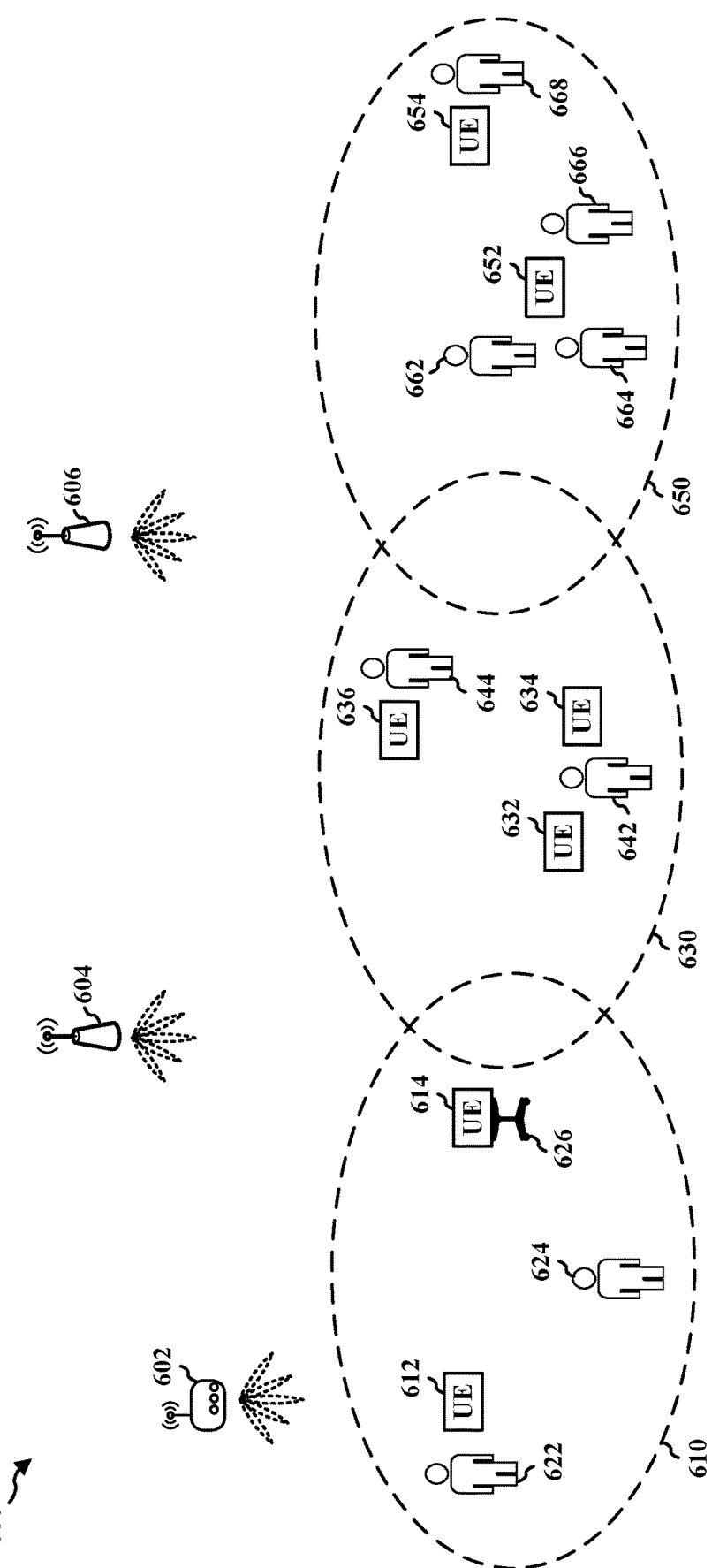
FIG. 6 is a diagram illustrating an example of a wireless communications system having a plurality of wireless devices, a plurality of objects, and a plurality of areas of interest, in accordance with various aspects of the present disclosure.

FIG. 6 is a diagram 600 illustrating an example of a wireless communications system having an area of interest 610, an area of interest 630, and an area of interest 650. A Each of the areas of interest may be associated with a set of network nodes and a set of UEs. For example, the area of interest 610 may be associated with the RSU 602, the TRP 604, the UE 612, and the UE 614. The area of interest 630 may be associated with the TRP 604, the TRP 606, the UE 636, the UE 632, and the UE 634. The area of interest 650 may be associated with the TRP 606, the UE 652, and the UE 654. The associated network nodes and/or the associated UEs may be considered wireless devices configured to sense objects within the area of interest 610 using monostatic sensing or bistatic sensing. For example, each of the RSU 602, the TRP 604, the UE 612, and/or the UE 614 may be configured to sense one or both of the object 622 or the object 624 in the area of interest 610. Each of the TRP 604, the TRP 606, the UE 636, the UE 632, and the UE 634 may be configured to sense one or both of the object 642 or the object 644 in the area of interest 630. Each of the TRP 606, the UE 652, and the UE 654 may be configured to sense one or each of the object 662, the object 664, the object 666, or the object 668 in the area of interest 650. The wireless devices may use monostatic sensing to transmit a sensing signal to the object and measure the reflected sensing signal from the object, or may cooperate with one another to transmit a sensing signal to the object, which may then be measured by another wireless device to measure the reflected sensing signal from the object. The wireless devices may indicate what kinds of sensors the sensing wireless device may use to gather data from a target object, such as an RF antenna, a LIDAR sensor, a SONAR sensor, a visual camera, a thermal camera, or an audio microphone. A wireless device positioned close to an object may be configured to measure attributes of the object with a higher degree of accuracy than a wireless device positioned further away from the object. For example, the UE 612 may be configured to generate a micro-Doppler profile of the object 622 (e.g., measure a heartbeat of a human or measure a breathing rate of a person), while the RSU 602 may not be able to measure such attributes of the object 622 with such a high degree of accuracy since the UE 612 is in closer physical proximity to the object 622. In another example, the RSU 602 may be configured to detect gestures or gaits of the object 622 (e.g., determine if the object 622 is waving or kicking, or determine if the object 622 is skipping or hopping), but the TRP 604 may not be able to measure such attributes of the object 622 with such a high degree of accuracy since the RSU 602 is in closer physical proximity to the object 622 than the TRP 604. In some aspects, a wireless device or a network node may be configured to calculate the degree of accuracy of a wireless device based upon at least one of its distance from an object, a strength of its sensor receiving the reflected sensing signal, or a strength of the sensing signal transmitted to the object.

In addition to performing sensing, the UEs in an area of interest may be configured to report attributes associated with the UE. In some aspects, a UE may be configured to report beam and channel state information (CSI) reference signal (CSI-RS) measurements, radio resource management (RRM) measurements, or sounding reference signal (SRS) transmission measurements. Such measurements may be used to indicate which UEs have the strongest or most reliable beam connections to network nodes, and beam directions for positioning measurements. In another aspect, a UE may be configured to report positioning reference signal (PRS) measurements, SRS positioning measurements, or measurements using other sensors (e.g., a barometer, a GNSS device, an inertial measurement unit (IMU). Such measurements may be used to indicate a position of the UE, and/or movement information of the UE.

A network node may be able to construct an association between a UE and an object based on attributes associated with the object collected by using sensing and based on attributes associated with a UE collected by communicating with the UE or by using sensing. For example, a network node may associate the UE 612 with the object 622 by determining that the position of the UE 612 is within a threshold distance of the object 622, and/or by determining that a shape profile of the object 622 indicates that the object 622 is holding the UE 612. In another example, a network node may associate the UE 614 with the object 626 by determining that the object 626 has a shape profile that indicates that the UE 614 is mounted on the object 626. In another example, a network node may associate both the UE 632 and the UE 634 with the object 642 by determining that both the UE 632 and the UE 634 are within a threshold distance of the object 642. In another example, a network node may associate the UE 652 with the object 662, the object 664, and the object 666 by determining that the UE 652 is within a threshold distance of the object 662, the object 664, and the object 666 for a period of time while the UE 652, the object 662, the object 664, and the object 666 are moving. In another aspect, a network node may not associate the object 624 with a UE if there is no UE within a threshold distance of the object 624. When a network node associates a set of UEs with a set of objects, the network node may use attributes of one of the associated UEs or objects to derive attributes of the other associated UEs or objects. For example, if a network node associates the object 642 with the UE 632 and the UE 634, the network node may perform positioning on the UE 632 to derive a position of the object 642, and the UE 634, or may perform sensing on the object 642 to derive a position of the UE 632 and the UE 634. Similarly, if a network node associates the UE 652 with the object the object 662, the object 664, and the object 666, then the network node may perform sensing on the object 664 to derive a position of the UE 652, the object 662 and the object 666, or may perform positioning on the UE 652 to derive a position of the object 662, the object 664, and the object 666. As a result, the network node may be able to track a position or a movement of a UE by tracking a position of an object, or vice-versa, and may be able to track a position or movement of a plurality of UEs and/or a plurality of objects by tracking a position or movement of a single UE or a single object.

Figure 7:
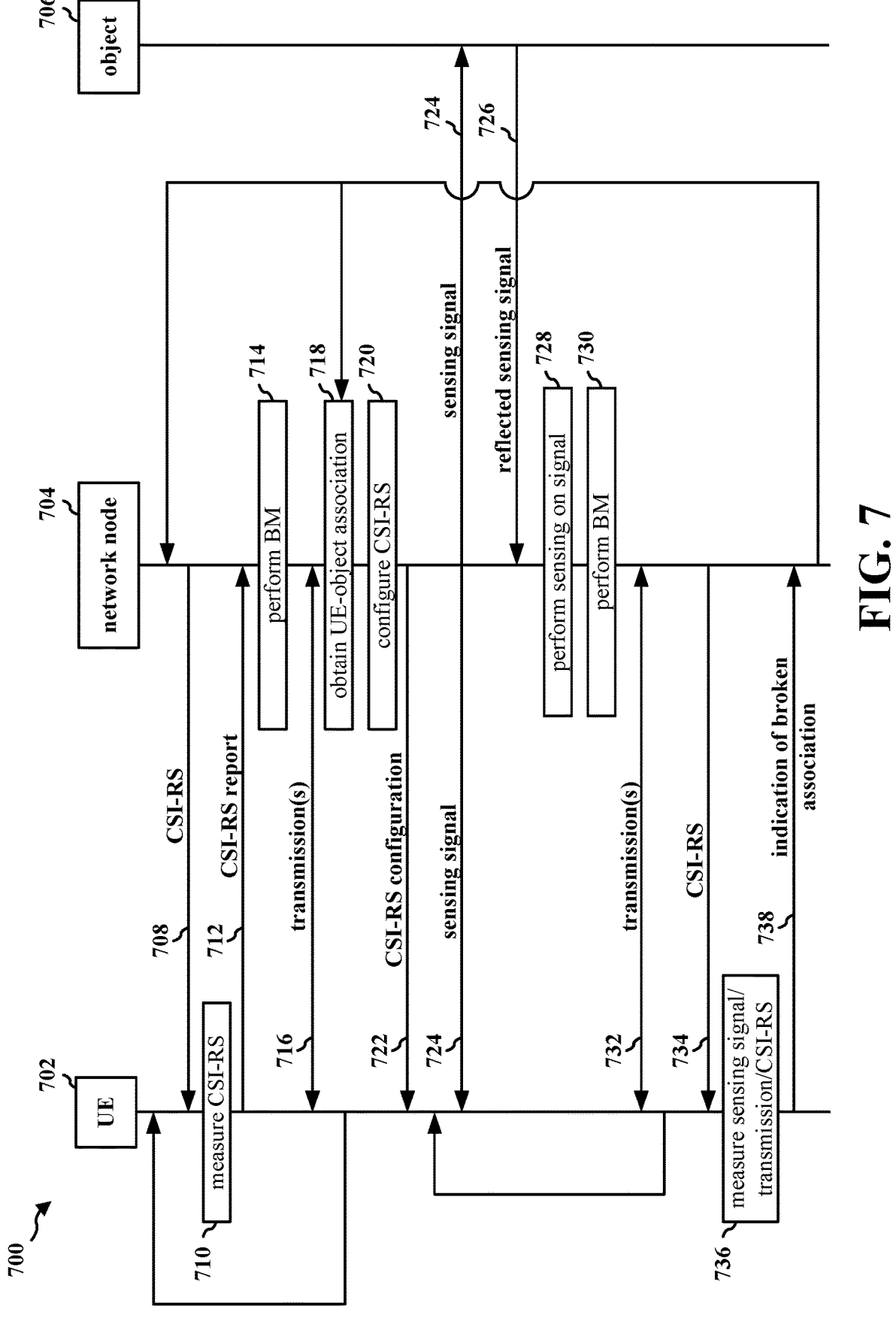
FIG. 7 is a communication flow diagram illustrating an example of a UE and a network node configured to perform beam management (BM) by leveraging a UE-object association between the UE and an object, in accordance with various aspects of the present disclosure.

FIG. 7 is a communication flow diagram 700 illustrating an example of a UE 702 and a network node 704 configured to perform BM by leveraging a UE-object association between the UE 702 and the object 706.

The network node 704 may transmit a CSI-RS 708 to the UE 702. The UE 702 may receive the CSI-RS 708 from the UE 702. The network node 704 may periodically transmit the CSI-RS 708 to the UE 702 in accordance with a periodicity, for example every 100 ms. or every second. At 710, the UE 702 may measure the CSI-RS 708 to construct a CSI-RS report 712. The CSI-RS report 712 may include, for example, an optimal beam pair based on RSRP measurements. The UE 702 may transmit the CSI-RS report 712 to the network node 704. The network node 704 may receive the CSI-RS report 712.

At 714, the network node 704 may perform BM based on the CSI-RS report 712. For example, the network node 704 may select a set of beams to communicate with the UE 702 based on the CSI-RS report 712. The network node 704 and the UE 702 may then communicate with one another using the set of transmissions 716. The network node 704 may be configured to periodically transmit the CSI-RS 708 to the UE 702, repeating the process periodically in order to maintain its connection with the UE 702. Such periodic updating may consume power and spectrum resources by the network node 704 transmitting the CSI-RS 708 to the UE 702 and the UE 702 transmitting the CSI-RS report 712 to the network node 704. In some aspects, the UE 702 may transmit other transmissions to the network node 704 for BM. For example, the UE 702 may transmit a sounding reference signal (SRS) to the network node 704. At 714, the network node 704 may perform BM using the SRS received from the UE 702. Similarly, periodic transmission of the SRS by the UE 702 to the network node 704 may consume power and spectrum resources.

To reduce the amount of power and spectrum resources used by the UE 702 and the network node 704 to perform BM at 714, the UE 702 and network node 704 may leverage a UE-object association. At 718, the network node 704 may obtain a UE-object association between the UE 702 and the object 706. The network node 704 may obtain the UE-object association in a plurality of ways. In one aspect, the network node 704 may receive the UE-object association from another network node, such as an LMF or a sensing server that associates a set of UEs with a set of objects. In another aspect, the network node 704 may perform monostatic beam sensing to determine a position of the object 706, and may communicate with the UE 702 or perform sensing on the UE 702 to determine a position of the UE 702, and may associate the UE 702 with the object 706 based on the retrieved position of the object 706 and the position of the UE 702. In another aspect, the network node 704 may perform bistatic beam sensing with another wireless device to determine a position of the object 706, and may communicate with the UE 702 or perform sensing on the UE 702 to determine a position of the UE 702, and may associate the UE 702 with the object 706 based on the retrieved position of the object 706 and the position of the UE 702.

After the network node 704 obtains the UE-object association between the UE 702 and the object 706 at 718, the network node 704 may autonomously perform BM without assistance from the UE 702. Instead of basing BM on a communication beam from the UE 702 (e.g., based on a measurement report from the UE 702 or an RS transmission from the UE 702), the network node 704 may use the object 706 as a proxy for the UE 702 via sensing. The network node 704 may perform sensing with the object 706 to determine the object's position (e.g., the object's location relative to the network node 704, the object's direction relative to an antenna of the network node 704) and perform BM based on the determined position or direction. In some aspects, the network node 704 may perform BM solely based on sensing the position or direction of the object 706. In some aspects, the network node 704 may perform BM using the sensing and using CSI-RS from the UE 702.

At 720, the network node 704 may configure the CSI-RS with the UE 702 to have a different periodicity. The network node 704 may increase the periodicity of the CSI-RS 734 transmitted to the UE 702 while the network node 704 performs sensing relative to the CSI-RS 708 transmitted to the UE 702 when the network node 704 does not perform sensing on the object 706 in order to reduce overhead when the network node 704 uses sensing to improve its BM. The network node 704 may create a CSI-RS configuration 722 that is updated with a higher periodicity. The network node 704 may transmit the CSI-RS configuration 722 to the UE 702. In some aspects, the network node 704 may configure the CSI-RS based on other information associated with the UE 702, such as a speed of the UE 702, a position of the UE 702, a projected path of the UE 702 that would place the UE 702 in a non-line-of-sight (non-LOS) position (e.g., a blocker is in between the UE 702 and the network node 704 that interferes with transmissions), or a distance of the UE 702 from the non-LOS position. The UE 702 may receive the CSI-RS configuration 722 from the network node 704.

Whether or not the network node 704 updates a CSI-RS configuration, the network node 704 may transmit a sensing signal 724 at the object 706. The object 706 may reflect the sensing signal 724 as the reflected sensing signal 726 to the network node 704. At 728, the network node 704 may perform sensing on the reflected sensing signal 726. In some aspects, the network node 704 may perform bistatic sensing, where another wireless device transmits the sensing signal that is reflected by the object 706 as the reflected sensing signal 726 to the network node 704, or where the object 706 reflects the sensing signal 724 to another wireless device, which performs sensing measurements that are reported to the network node 704 to determine a position or a direction of the object 706 relative to the network node 704. In some aspects, the network node 704 may use other sensors in addition to, or instead of, RF sensors to track a position of the object 706, such as a camera or a microphone. The network node 704 may calculate an angle of arrival (AoA) of the reflected sensing signal 726 at the network node 704 or an angle of departure (AoD) of the reflected sensing signal 726 at the object 706.

At 730, the network node 704 may perform BM based on the sensing measurements. The beam direction of the reflected sensing signal 726 may be used to track both the object 706, and the UE 702 as the object 706 may be treated as a proxy for the UE 702. The network node 704 and the UE 702 may then communicate with one another using the set of transmissions 732. The network node 704 may be configured to periodically transmit the sensing signal 724 to the object 706, repeating the process periodically in order to maintain its connection with the UE 702. Such periodic updating may consume less power and spectrum resources by the network node 704 than when the network node 704 periodically transmits the CSI-RS 708.

The network node 704 may transmit the CSI-RS 734 at the UE 702 based on the CSI-RS configuration 722. The UE 702 may receive the CSI-RS 734 from the network node 704 based on the CSI-RS configuration 722. The CSI-RS 734 may be transmitted at a higher periodicity relative to the CSI-RS 708. At 736, the UE 702 may monitor the link quality between the UE 702 and the network node 704 by measuring the sensing signal 724 transmitted by the network node 704, one of the set of transmissions 732 from the network node 704, or the CSI-RS 734 from the network node 704. If one of the signals becomes weaker over time, then the UE 702 may determine that the UE-object association link between the UE 702 and the object 706 has been broken. In other words, the network node 704 may be tracking the position of the object 706, but the UE 702 may no longer be within the vicinity of the object 706, which reduces the efficacy of the BM performed at 730 based on the position of the object 706.

The UE 702 may transmit an indication 738 of the broken association to the network node 704. The network node 704 may receive the indication 738 of the broken association from the network node 704. The UE 702 may transmit the indication 738 of the broken association based on one or more measurements performed at 736. For example, the UE 702 may transmit the indication 738 of the broken association based on a measured signal being equal or less than a threshold RSRP value, or a threshold relative RSRP backoff. The UE 702 may calculate the threshold RSRP value, or a threshold relative RSRP backoff based on historical measurements, or may receive the threshold RSRP value, or a threshold relative RSRP backoff from the network node 704 in a message, such as the CSI-RS configuration 722. The UE 702 may have different threshold values for different measurements. For example, the UE 702 may have a first threshold value for measurements of the sensing signal 724, a second threshold value for measurements of the set of transmissions 732, and a third threshold value for measurements of the CSI-RS 734. In response to the UE 702 determining that the monitored link quality is equal to, or below, a threshold value, the UE 702 may transmit the indication 738 of the broken association to the network node 704. The indication 738 of the broken association to the network node 704 may be transmitted in a plurality of ways, for example as an uplink control information (UCI) message, a sounding reference signal (SRS), a random access channel (RACH) message, or a medium access control (MAC) control element (MAC-CE) including the indication 738 of the broken association. In some aspects, the indication 738 of the broken association may include a request for the network node 704 to perform a fallback BM and/or a request to reconstruct the UE-object association. In response, the network node 704 may re-establish a UE-object association with the UE 702 at 718, or may perform BM using the CSI-RS 708.

While the communication flow diagram 700 shows one UE, one network node, and one object, UE 702, network node 704, and object 706, respectively, configured to perform beam management between a network node and a UE using an object-UE association, any number of UEs, network nodes, and objects may be used. For example, the UE 702 may be associated with a plurality of objects, at least one of which may be tracked by the network node 704 to perform BM on the UE 702. If an association between the UE 702 and one of the objects breaks, the UE 702 may transmit an indication 738 of the broken association to the network node 704, and the network node 704 may continue to perform BM on the UE 702 using the other objects that are associated with the UE 702. Similarly, the object 706 may be associated with a plurality of UEs. If an association between the object 706 and one of the UEs breaks, the one UE may transmit an indication of the broken association to its serving network node, but the network node, or other network nodes, may continue perform BM on the other UEs using the UE-object association with other UEs that the object 706 is associated with. In another aspect, the UE 702 may change from one serving cell to another serving cell, and if the UE 702 changes from a first zone with the network node 704 to another serving cell of another network node, the other network node may perform BM with the UE 702 using the UE-object association between the UE 702 and the object 706. The network nodes may communicate with one another via a backhaul or a midhaul link to perform the handoff.

Figure 8:
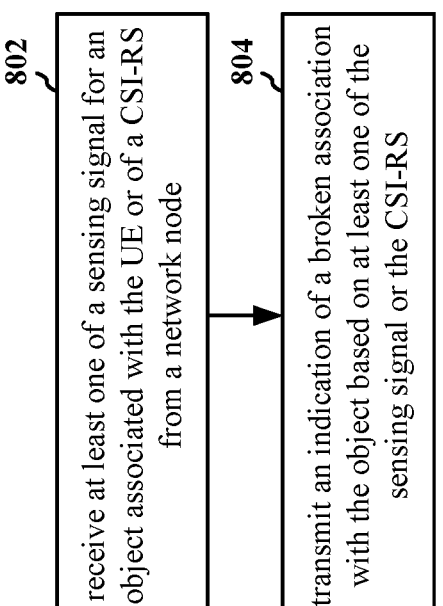
FIG. 8 is a flowchart of a method of wireless communication.

FIG. 8 is a flowchart 800 of a method of wireless communication. The method may be performed by a UE (e.g., the UE 104, the UE 350, the UE 404, the UE 612, the UE 614, the UE 632, the UE 634, the UE 636, the UE 652, the UE 654, the UE 702; the wireless device 502, the wireless device 504, the wireless device 506, the wireless device 508; the apparatus 1104). At 802, the UE may receive at least one of a sensing signal for an object associated with the UE or of a CSI-RS from a network node. For example, 802 may be performed by the UE 702 in FIG. 7, which may receive the sensing signal 724 for the object 706 associated with the UE 702 from the network node 704 and/or the CSI-RS 708 from the network node 704. Moreover, 802 may be performed by the component 198 in FIG. 1, 3, or 11.

At 804, the UE may transmit an indication of a broken association with the object based on at least one of the sensing signal or the CSI-RS. For example, 804 may be performed by the UE 702 in FIG. 7, which may transmit the indication 738 of the broken association with the object 706 based on the sensing signal 724 or the CSI-RS 734. Moreover, 804 may be performed by the component 198 in FIG. 1, 3, or 11.

Figure 9:
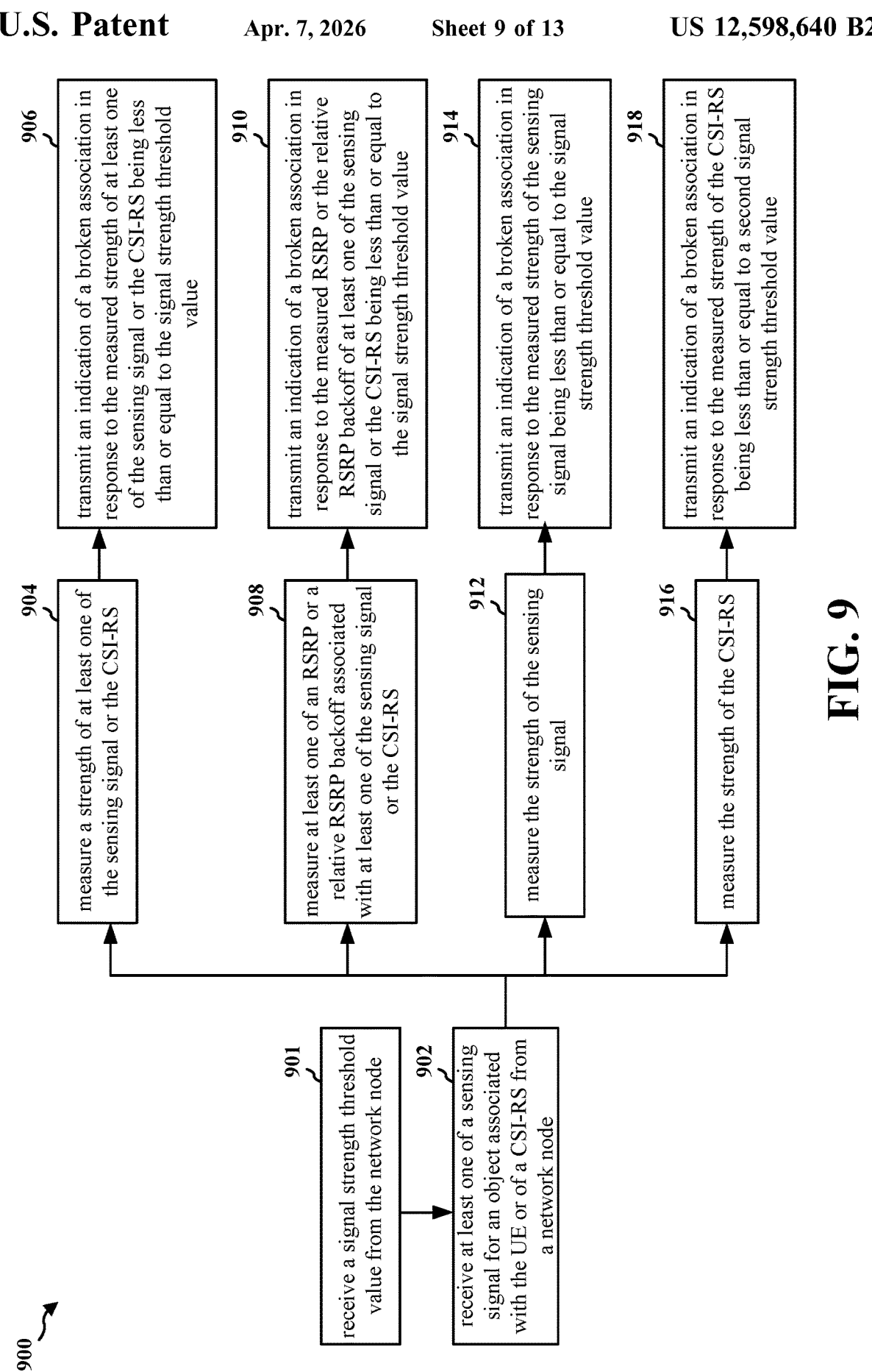
FIG. 9 is a flowchart of a method of wireless communication.

FIG. 9 is a flowchart 900 of a method of wireless communication. The method may be performed by a UE (e.g., the UE 104, the UE 350, the UE 404, the UE 612, the UE 614, the UE 632, the UE 634, the UE 636, the UE 652, the UE 654, the UE 702; the wireless device 502, the wireless device 504, the wireless device 506, the wireless device 508; the apparatus 1104). At 901, the UE may receive a signal strength threshold value from the network node. For example, 901 may be performed by the UE 702 in FIG. 7, which may receive a signal strength threshold value from the network node 704 in the CSI-RS configuration 722. Moreover, 901 may be performed by the component 198 in FIG. 1, 3, or 11.

At 902, the UE may receive at least one of a sensing signal for an object associated with the UE or of a CSI-RS from a network node. For example, 902 may be performed by the UE 702 in FIG. 7, which may receive the sensing signal 724 for the object 706 associated with the UE 702 from the network node 704 and/or the CSI-RS 708 from the network node 704. Moreover, 902 may be performed by the component 198 in FIG. 1, 3, or 11.

At 904, the UE may measure a strength of at least one of the sensing signal or the CSI-RS. For example, 904 may be performed by the UE 702 in FIG. 7, which may transmit the indication 738 of the broken association with the object 706 based on the sensing signal 724 or the CSI-RS 734. Moreover, 904 may be performed by the component 198 in FIG. 1, 3, or 11.

At 906, the UE may transmit an indication of a broken association in response to the measured strength of at least one of the sensing signal or the CSI-RS being less than or equal to the signal strength threshold value. For example, 906 may be performed by the UE 702 in FIG. 7, which may transmit an indication 738 of a broken association between the UE 702 and the object 706 in response to the measured strength of at least one of the sensing signal 724 or the CSI-RS 734 being less than or equal to the signal strength threshold value. Moreover, 906 may be performed by the component 198 in FIG. 1, 3, or 11.

At 908, the UE may measure at least one of an RSRP or a relative RSRP backoff associated with at least one of the sensing signal or the CSI-RS. For example, 908 may be performed by the UE 702 in FIG. 7, which may measure at least one of an RSRP or a relative RSRP backoff associated with at least one of the sensing signal 724 or the CSI-RS 734. Moreover, 908 may be performed by the component 198 in FIG. 1, 3, or 11.

At 910, the UE may transmit an indication of a broken association in response to the measured RSRP or the relative RSRP backoff of at least one of the sensing signal or the CSI-RS being less than or equal to the signal strength threshold value. For example, 910 may be performed by the UE 702 in FIG. 7, which may transmit an indication 738 of a broken association between the UE 702 and the object 706 in response to the measured RSRP or the relative RSRP backoff of at least one of the sensing signal 724 or the CSI-RS 734 being less than or equal to the signal strength threshold value. Moreover, 910 may be performed by the component 198 in FIG. 1, 3, or 11.

At 912, the UE may measure the strength of the sensing signal. For example, 912 may be performed by the UE 702 in FIG. 7, which may, at 736, measure the strength of the sensing signal 724. Moreover, 912 may be performed by the component 198 in FIG. 1, 3, or 11.

At 914, the UE may transmit an indication of a broken association in response to the measured strength of the sensing signal being less than or equal to the signal strength threshold value. For example, 914 may be performed by the UE 702 in FIG. 7, which may transmit an indication 738 of a broken association between the UE 702 and the object 706 in response to the measured strength of the sensing signal 724 being less than or equal to the signal strength threshold value. Moreover, 914 may be performed by the component 198 in FIG. 1, 3, or 11.

At 916, the UE may measure the strength of the CSI-RS. For example, 916 may be performed by the UE 702 in FIG. 7, which may, at 736, measure the strength of the CSI-RS 734. Moreover, 916 may be performed by the component 198 in FIG. 1, 3, or 11.

At 918, the UE may transmit an indication of a broken association in response to the measured strength of the CSI-RS being less than or equal to a second signal strength threshold value. For example, 918 may be performed by the UE 702 in FIG. 7, which may transmit an indication 738 of a broken association between the UE 702 and the object 706 in response to the measured strength of the CSI-RS 734 (measured at 736) being less than or equal to a second signal strength threshold value. Moreover, 918 may be performed by the component 198 in FIG. 1, 3, or 11.

Figure 10:
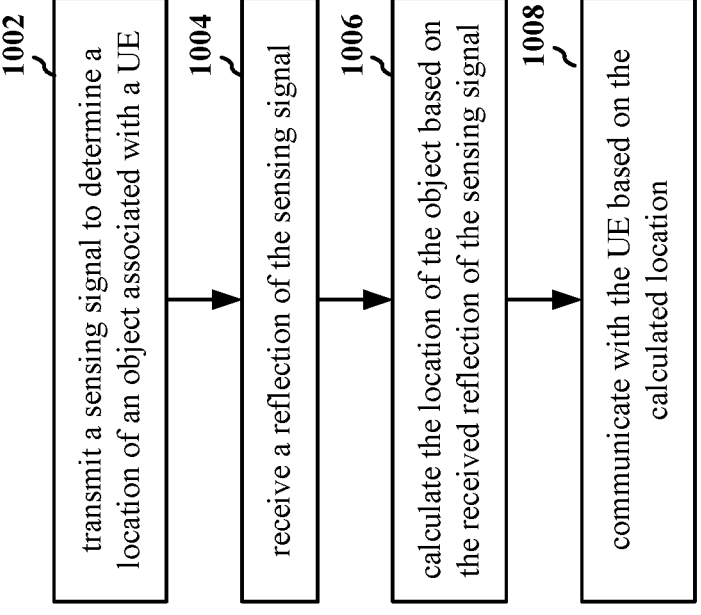
FIG. 10 is a flowchart of a method of wireless communication.
Figure 10:

FIG. 10 is a flowchart 1000 of a method of wireless communication. The method may be performed by a base station (e.g., the base station 102, the base station 310; the TRP 402, the TRP 406, the TRP 604, the TRP 606; the wireless device 502, the wireless device 504, the wireless device 506, the wireless device 508; the RSU; the network node 704; the network entity 1102, the network entity 1202, the network entity 1360). At 1002, the network node may transmit a sensing signal to determine a location of an object associated with a UE. For example, 1002 may be performed by the network node 704 in FIG. 7, which may transmit the sensing signal 724 to determine a location of the object 706 associated with the UE 702. Moreover, 1002 may be performed by the component 199 in FIG. 1, 3, 11, 12, or 13.

At 1004, the network node may receive a reflection of the sensing signal. For example, 1004 may be performed by the network node 704 in FIG. 7, which may receive a reflection of the sensing signal 724 as the reflected sensing signal 726. Moreover, 1004 may be performed by the component 199 in FIG. 1, 3, 11, 12, or 13.

At 1006, the network node may calculate the location of the object based on the received reflection of the sensing signal. For example, 1006 may be performed by the network node 704 in FIG. 7, which may, at 728, calculate the location of the object 706 based on the reflected sensing signal 726. Moreover, 1006 may be performed by the component 199 in FIG. 1, 3, 11, 12, or 13.

At 1008, the network node may communicate with the UE based on the calculated location. For example, 1008 may be performed by the network node 704 in FIG. 7, which may communicate with the UE based on the calculated location at 728 by performing BM at 730 and then communicating with the UE 702 via the set of transmission 732. Moreover, 1008 may be performed by the component 199 in FIG. 1,3, 11, 12, or 13.

Figure 11:
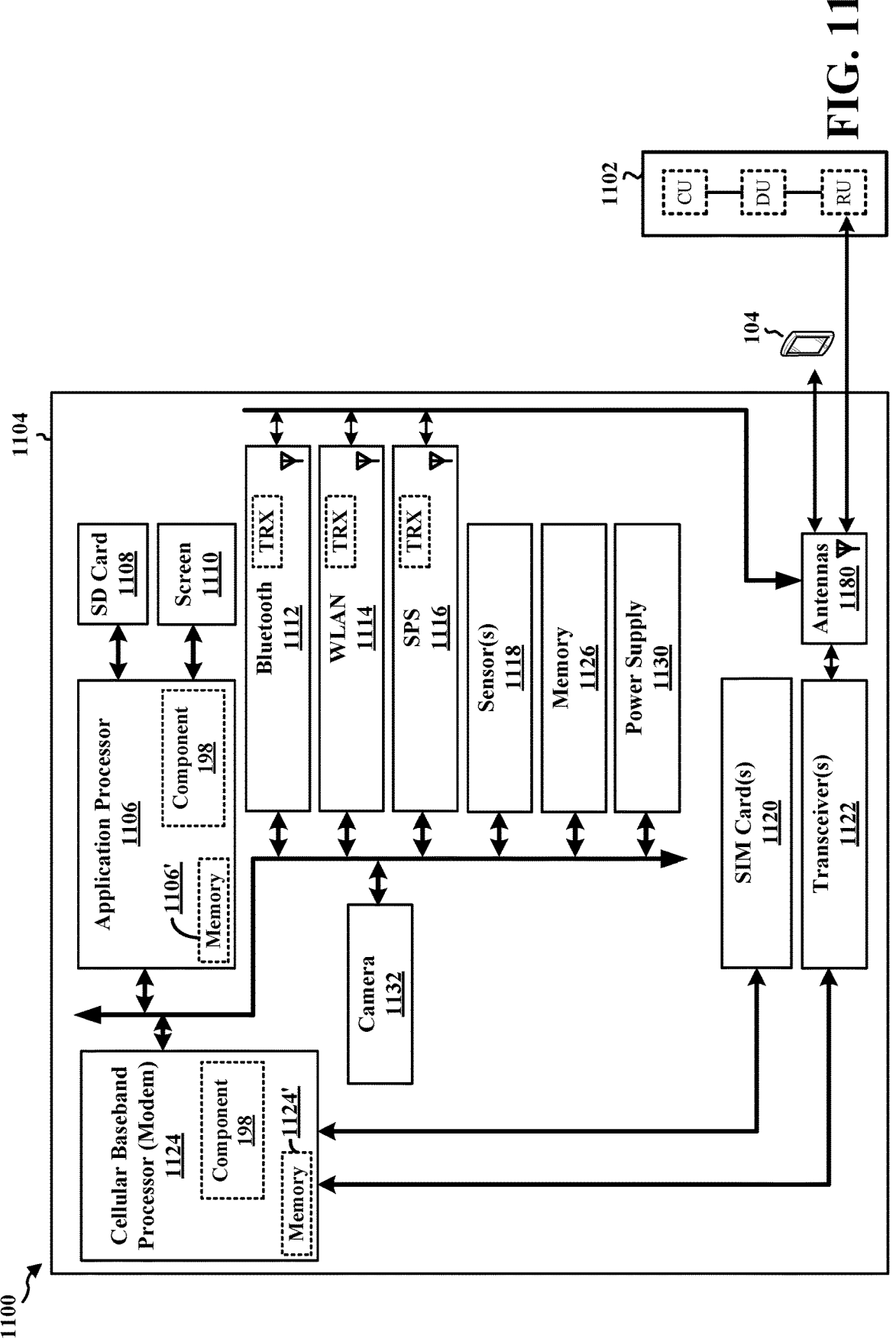
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers 1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial measurement unit (IMU), gyroscope, and/or accelerometer (s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (Rx)). The Bluetooth module 1112, the WLAN module 1114, and the SPS module 1116 may include their own dedicated antennas and/or utilize the antennas 1180 for communication. The cellular baseband processor 1124 communicates through the transceiver(s) 1122 via one or more antennas 1180 with the UE 104 and/or with an RU associated with a network entity 1102. The cellular baseband processor 1124 and the application processor 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the Tx processor 368, the Rx processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see UE 350 of FIG. 3) and include the additional modules of the apparatus 1104.

As discussed supra, the component 198 may be configured to receive at least one of a sensing signal for an object associated with the UE or of a CSI-RS from a network node. The component 198 may be configured to transmit an indication of a broken association with the object based on at least one of the sensing signal or the CSI-RS. The component 198 may be within the cellular baseband processor 1124, the application processor 1106, or both the cellular baseband processor 1124 and the application processor 1106. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, may include means for receiving at least one of a sensing signal for an object associated with the UE or of a CSI-RS from a network node. The apparatus 1104 may include means for transmitting an indication of a broken association with the object based on at least one of the sensing signal or the CSI-RS. The apparatus 1104 may include means for measuring a strength of at least one of the sensing signal or the CSI-RS. The apparatus 1104 may include means for transmitting the indication of the broken association in response to the measured strength of at least one of the sensing signal or the CSI-RS being less than or equal to a signal strength threshold value. The apparatus 1104 may include means for measuring the strength of at least one of the sensing signal or the CSI-RS by measuring at least one of an RSRP or a relative RSRP backoff associated with at least one of the sensing signal or the CSI-RS. The apparatus 1104 may include means for receiving the signal strength threshold value from the network node. The apparatus 1104 may include means for receiving the signal strength threshold value from the network node. The apparatus 1104 may include means for transmitting the indication of the broken association in response to the measured strength of the sensing signal being less than or equal to a first signal strength threshold value. The apparatus 1104 may include means for measuring the strength of at least one of the sensing signal or the CSI-RS by measuring the strength of the CSI-RS. The apparatus 1104 may include means for transmitting the indication of the broken association in response to the measured strength of the CSI-RS being less than or equal to a second signal strength threshold value. The apparatus 1104 may include means for transmitting the indication of the broken association with the object by transmitting at least one of a UCI message, an SRS, a RACH message, or a MAC-CE including the indication of the broken association. The apparatus 1104 may include means for transmitting the indication of the broken association with the object by transmitting at least one of a UCI message, an SRS, a RACH message, or a MAC-CE including the indication of the broken association. The apparatus 1104 may include means for transmitting the indication of the broken association with the object by transmitting a request to construct an association between the UE and at least one other object. The apparatus 1104 may include means for receiving a first CSI-RS configuration including a first indication of a first periodicity. The apparatus 1104 may include means for receiving a first CSI-RS from the network node. The apparatus 1104 may include means for receiving an updated CSI-RS configuration including a second indication of a second periodicity. The apparatus 1104 may include means for receiving the sensing signal after receiving the updated CSI-RS configuration. The apparatus 1104 may include means for measuring the CSI-RS. The apparatus 1104 may include means for transmitting a CSI-RS report based on the CSI-RS. The apparatus 1104 may include means for receiving a second indication of an association between the UE and the object. The apparatus 1104 may include means for transmitting the indication of the broken association based on the second indication of the association between the UE and the object. The means may be the component 198 of the apparatus 1104 configured to perform the functions recited by the means. As described supra, the apparatus 1104 may include the Tx processor 368, the Rx processor 356, and the controller/processor 359. As such, in one configuration, the means may be the Tx processor 368, the Rx processor 356, and/or the controller/processor 359 configured to perform the functions recited by the means.

Figure 12:
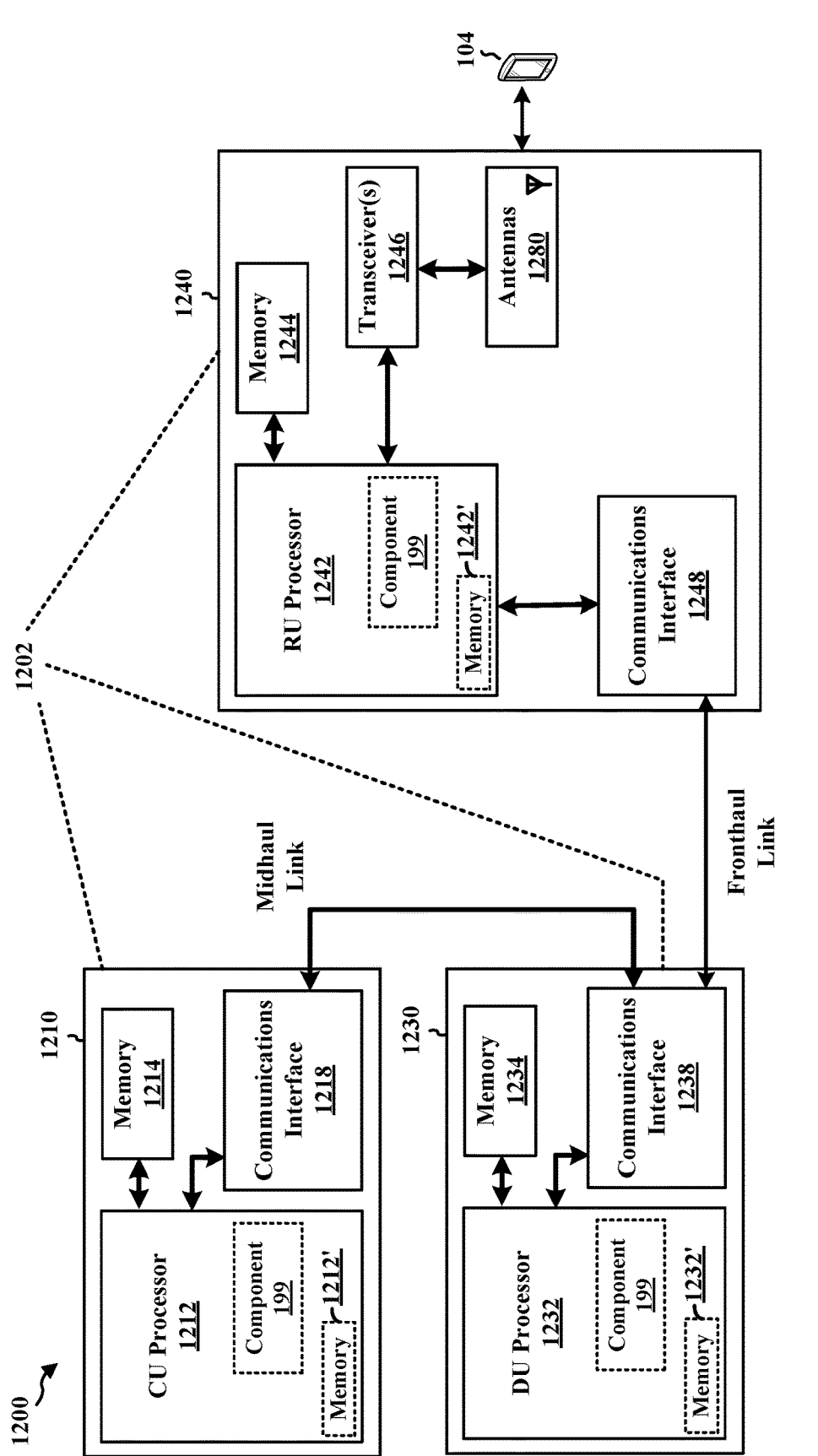
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the component 199, the network entity 1202 may include the CU 1210; both the CU 1210 and the DU 1230; cach of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include a DU processor 1232. The DU processor 1232 may include on-chip memory 1232'. In some aspects, the DU 1230 may further include additional memory modules 1234 and a communications interface 1238. The DU 1230 communicates with the RU 1240 through a fronthaul link. The RU 1240 may include an RU processor 1242. The RU processor 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to transmit a sensing signal to determine a location of an object associated with a UE. The component 199 may be configured to receive a reflection of the sensing signal. The component 199 may be configured to calculate the location of the object based on the received reflection of the sensing signal. The component 199 may be configured to communicate with the UE based on the calculated location. The component 199 may be within one or more processors of one or more of the CU 1210, DU 1230, and the RU 1240. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1202 may include a variety of components configured for various functions. In one configuration, the network entity 1202 may include means for transmitting a sensing signal to determine a location of an object associated with a UE. The network entity 1202 may include means for receiving a reflection of the sensing signal. The network entity 1202 may include means for calculating the location of the object based on the received reflection of the sensing signal. The network entity 1202 may include means for communicating with the UE based on the calculated location. The network entity 1202 may include means for performing BM on the UE based on the calculated location. The network entity 1202 may include means for transmitting the sensing signal by periodically transmitting the sensing signal. The network entity 1202 may include means for transmitting a first CSI-RS configuration including a first indication of a first periodicity. The network entity 1202 may include means for transmitting a first set of CSI-RS to the UE based on the first periodicity. The network entity 1202 may include means for associating the UE with the object. The network entity 1202 may include means for transmitting an updated CSI-RS configuration including a second indication of a second periodicity. The network entity 1202 may include means for transmitting the sensing signal after transmitting the updated CSI-RS configuration. The network entity 1202 may include means for transmitting a second set of CSI-RS to the UE based on the second periodicity. The network entity 1202 may include means for receiving a CSI-RS report based on the first set of CSI-RS. The network entity 1202 may include means for transmitting a CSI-RS. The network entity 1202 may include means for receiving an indication of a broken association with the object from the UE based on at least one of the sensing signal or the CSI-RS. The network entity 1202 may include means for transmitting a signal strength threshold value to the UE. The network entity 1202 may include means for receiving the indication of the broken association based on the signal strength threshold value. The network entity 1202 may include means for transmitting a first signal strength threshold value associated with the sensing signal. The network entity 1202 may include means for transmitting a second signal strength threshold value associated with the CSI-RS. The network entity 1202 may include means for receiving the indication of the broken association based on at least one of the first signal strength threshold value or the second signal strength threshold value. The network entity 1202 may include means for receiving the indication of the broken association with the object may include receiving at least one of a UCI message, an SRS, a RACH message, or a MAC-CE including the indication of the broken association. The network entity 1202 may include means for receiving the indication of the broken association with the object by receiving a request to trigger a fallback BM procedure. The network entity 1202 may include means for initiating a BM procedure in response to the request to trigger the fallback BM procedure. The network entity 1202 may include means for receiving the indication of the broken association with the object by receiving a request to construct an association between the UE and at least one other object. The network entity 1202 may include means for initiating a UE-object association procedure in response to the request to construct the association between the UE and the at least one other object. The network entity 1202 may include means for transmitting a second indication of an association between the UE and the object. The network entity 1202 may include means for receiving the indication of the broken association based on the second indication of the association between the UE and the object. The means may be the component 199 of the network entity 1202 configured to perform the functions recited by the means. As described supra, the network entity 1202 may include the Tx processor 316, the Rx processor 370, and the controller/ processor 375. As such, in one configuration, the means may be the Tx processor 316, the Rx processor 370, and/or the controller/processor 375 configured to perform the functions recited by the means.

Figure 13:
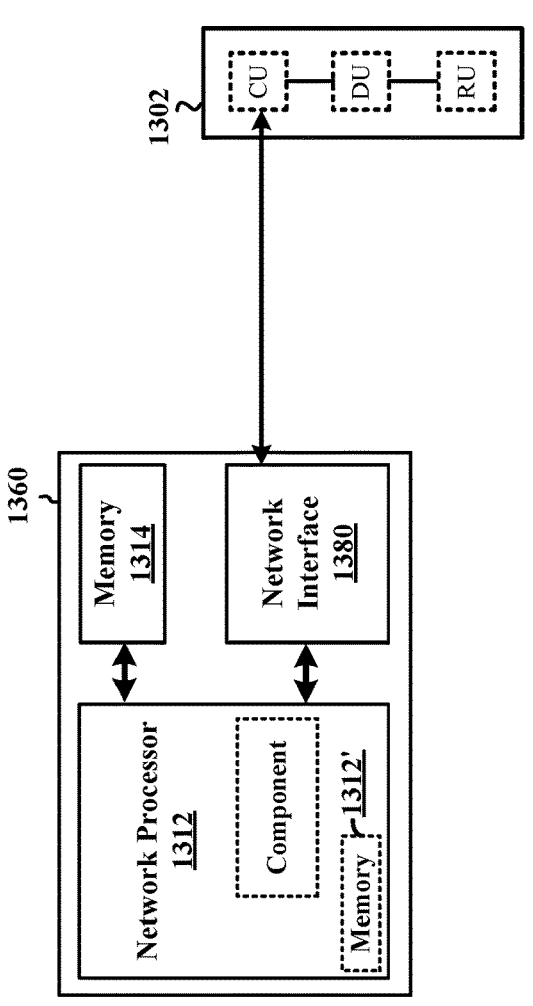
FIG. 13 is a diagram illustrating an example of a hardware implementation for an example network entity.

FIG. 13 is a diagram 1300 illustrating an example of a hardware implementation for a network entity 1360. In one example, the network entity 1360 may be within the core network 120. The network entity 1360 may include a network processor 1312. The network processor 1312 may include on-chip memory 1312'. In some aspects, the network entity 1360 may further include additional memory modules 1314. The network entity 1360 communicates via the network interface 1380 directly (e.g., backhaul link) or indirectly (e.g., through a RIC) with the CU 1302. The on-chip memory 1312' and the additional memory modules 1314 may each be considered a computer-readable medium/ memory. Each computer-readable medium/memory may be non-transitory. The processor 1312 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to transmit a sensing signal to determine a location of an object associated with a UE. The component 199 may be configured to receive a reflection of the sensing signal. The component 199 may be configured to calculate the location of the object based on the received reflection of the sensing signal. The component 199 may be configured to communicate with the UE based on the calculated location. The component 199 may be within the processor 1312. The component 199 may be one or more hardware components specifically configured to carry out the stated processes/ algorithm, implemented by one or more processors configured to perform the stated processes/algorithm, stored within a computer-readable medium for implementation by one or more processors, or some combination thereof. The network entity 1360 may include a variety of components configured for various functions. In one configuration, the network entity 1360 may include means for transmitting a sensing signal to determine a location of an object associated with a UE. The network entity 1360 may include means for receiving a reflection of the sensing signal. The network entity 1360 may include means for calculating the location of the object based on the received reflection of the sensing signal. The network entity 1360 may include means for communicating with the UE based on the calculated location. The network entity 1360 may include means for performing BM on the UE based on the calculated location. The network entity 1360 may include means for transmitting the sensing signal by periodically transmitting the sensing signal. The network entity 1360 may include means for transmitting a first CSI-RS configuration including a first indication of a first periodicity. The network entity 1360 may include means for transmitting a first set of CSI-RS to the UE based on the first periodicity. The network entity 1360 may include means for associating the UE with the object. The network entity 1360 may include means for transmitting an updated CSI-RS configuration including a second indication of a second periodicity. The network entity 1360 may include means for transmitting the sensing signal after transmitting the updated CSI-RS configuration. The network entity 1360 may include means for transmitting a second set of CSI-RS to the UE based on the second periodicity. The network entity 1360 may include means for receiving a CSI-RS report based on the first set of CSI-RS. The network entity 1360 may include means for transmitting a CSI-RS. The network entity 1360 may include means for receiving an indication of a broken association with the object from the UE based on at least one of the sensing signal or the CSI-RS. The network entity 1360 may include means for transmitting a signal strength threshold value to the UE. The network entity 1360 may include means for receiving the indication of the broken association based on the signal strength threshold value. The network entity 1360 may include means for transmitting a first signal strength threshold value associated with the sensing signal. The network entity 1360 may include means for transmitting a second signal strength threshold value associated with the CSI-RS. The network entity 1360 may include means for receiving the indication of the broken association based on at least one of the first signal strength threshold value or the second signal strength threshold value. The network entity 1360 may include means for receiving the indication of the broken association with the object may include receiving at least one of a UCI message, an SRS, a RACH message, or a MAC-CE including the indication of the broken association. The network entity 1360 may include means for receiving the indication of the broken association with the object by receiving a request to trigger a fallback BM procedure. The network entity 1360 may include means for initiating a BM procedure in response to the request to trigger the fallback BM procedure. The network entity 1360 may include means for receiving the indication of the broken association with the object by receiving a request to construct an association between the UE and at least one other object. The network entity 1360 may include means for initiating a UE-object association procedure in response to the request to construct the association between the UE and the at least one other object. The network entity 1360 may include means for transmitting a second indication of an association between the UE and the object. The network entity 1360 may include means for receiving the indication of the broken association based on the second indication of the association between the UE and the object. The means may be the component 199 of the network entity 1360 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data.

The following aspects are illustrative only and may be combined with other aspects or teachings described herein, without limitation.

Aspect 1 is a method of wireless communication at a UE, where the method may include receiving at least one of a sensing signal for an object associated with the UE or of a CSI-RS from a network node. The method may include transmitting an indication of a broken association with the object based on at least one of the sensing signal or the CSI-RS.

Aspect 2 is the method of aspect 1, where the method may include measuring a strength of at least one of the sensing signal or the CSI-RS. Transmitting the indication of the broken association may be in response to the measured strength of at least one of the sensing signal or the CSI-RS being less than or equal to a signal strength threshold value.

Aspect 3 is the method of aspect 2, where measuring the strength of at least one of the sensing signal or the CSI-RS may include measuring at least one of an RSRP or a relative RSRP backoff associated with at least one of the sensing signal or the CSI-RS.

Aspect 4 is the method of either of aspects 2 or 3, where the method may include receiving the signal strength threshold value from the network node.

Aspect 5 is the method of any of aspects 2 to 4, where measuring the strength of at least one of the sensing signal or the CSI-RS may include measuring the strength of the sensing signal. Transmitting the indication of the broken association may be in response to the measured strength of the sensing signal being less than or equal to a first signal strength threshold value. Measuring the strength of at least one of the sensing signal or the CSI-RS may include measuring the strength of the CSI-RS. Transmitting the indication of the broken association may be in response to the measured strength of the CSI-RS being less than or equal to a second signal strength threshold value.

Aspect 6 is the method of aspect 5, where the first signal strength threshold value and the second signal strength threshold value may be different.

Aspect 7 is the method of any of aspects 1 to 6, where transmitting the indication of the broken association with the object may include transmitting at least one of a UCI message, an SRS, a RACH message, or a MAC-CE including the indication of the broken association.

Aspect 8 is the method of any of aspects 1 to 7, where transmitting the indication of the broken association with the object may include transmitting a request to trigger a fallback BM procedure.

Aspect 9 is the method of any of aspects 1 to 8, where transmitting the indication of the broken association with the object may include transmitting a request to construct an association between the UE and at least one other object.

Aspect 10 is the method of any of aspects 1 to 9, where the method may include receiving a first CSI-RS configuration including a first indication of a first periodicity. The method may include receiving a first CSI-RS from the network node. The method may include receiving an updated CSI-RS configuration including a second indication of a second periodicity. The second periodicity may be greater than the first periodicity. The method may include receiving the sensing signal after receiving the updated CSI-RS configuration.

Aspect 11 is the method of any of aspects 1 to 10, where the method may include measuring the CSI-RS. The method may include transmitting a CSI-RS report based on the CSI-RS.

Aspect 12 is the method of any of aspects 1 to 11, where the method may include receiving a second indication of an association between the UE and the object. Transmitting the indication of the broken association may be based on the second indication of the association between the UE and the object.

Aspect 13 is a method of wireless communication at a network node, where the method may include transmitting a sensing signal to determine a location of an object associated with a UE. The method may include receiving a reflection of the sensing signal. The method may include calculating the location of the object based on the received reflection of the sensing signal. The method may include communicating with the UE based on the calculated location.

Aspect 14 is the method of aspect 13, where communicating with the UE may include performing BM on the UE based on the calculated location.

Aspect 15 is the method of either of aspects 13 or 14, where transmitting the sensing signal may include periodically transmitting the sensing signal.

Aspect 16 is the method of any of aspects 13 to 15, where the method may include transmitting a first CSI-RS configuration including a first indication of a first periodicity. The method may include transmitting a first set of CSI-RS to the UE based on the first periodicity. The method may include associating the UE with the object. The method may include transmitting an updated CSI-RS configuration including a second indication of a second periodicity. The second periodicity may be greater than the first periodicity. The method may include transmitting the sensing signal after transmitting the updated CSI-RS configuration. The method may include transmitting a second set of CSI-RS to the UE based on the second periodicity.

Aspect 17 is the method of aspect 16, where the method may include receiving a CSI-RS report based on the first set of CSI-RS. The second periodicity may be based on the CSI-RS report.

Aspect 18 is the method of aspect 17, where the CSI-RS report may include at least one of a speed, a position, or a projected path towards a non-LOS position. The second periodicity may be further based on at least one of the speed, the position, or the projected path towards the non-LOS position.

Aspect 19 is the method of any of aspects 13 to 18, where the method may include transmitting a CSI-RS. The method may include receiving an indication of a broken association with the object from the UE based on at least one of the sensing signal or the CSI-RS.

Aspect 20 is the method of aspect 19, where the method may include transmitting a signal strength threshold value to the UE. Receiving the indication of the broken association may be based on the signal strength threshold value.

Aspect 21 is a method of either of aspects 19 or 20, where the method may include transmitting a first signal strength threshold value associated with the sensing signal. The method may include transmitting a second signal strength threshold value associated with the CSI-RS. Receiving the indication of the broken association may be based on at least one of the first signal strength threshold value or the second signal strength threshold value.

Aspect 22 is the method of any of aspects 19 to 21, where the method may include receiving the indication of the broken association with the object includes receiving at least one of a UCI message, an SRS, a RACH message, or a MAC-CE including the indication of the broken association.

Aspect 23 is the method of any of aspects 13 and 22, where receiving the indication of the broken association with the object may include receiving a request to trigger a fallback BM procedure. The method may include initiating a BM procedure in response to the request to trigger the fallback BM procedure.

Aspect 24 is the method of any of aspects 13 to 23, where receiving the indication of the broken association with the object may include receiving a request to construct an association between the UE and at least one other object. The method may include initiating a UE-object association procedure in response to the request to construct the association between the UE and the at least one other object.

Aspect 25 is the method of any of aspects 13 to 24, where the method may include transmitting a second indication of an association between the UE and the object. Receiving the indication of the broken association may be based on the second indication of the association between the UE and the object.

Aspect 26 is an apparatus for wireless communication, including: a memory; and at least one processor coupled to the memory and, based at least in part on information stored in the memory, the at least one processor is configured to implement any of aspects 1 to 25.

Aspect 27 is the apparatus of aspect 26, further including at least one of an antenna or a transceiver coupled to the at least one processor.

Aspect 28 is an apparatus for wireless communication including means for implementing any of aspects 1 to 25.

Aspect 29 is a computer-readable medium (e.g., a non-transitory computer-readable medium) storing computer executable code, where the code when executed by a processor causes the processor to implement any of aspects 1 to 25.

What is claimed is:

1. An apparatus for wireless communication at a user equipment (UE), comprising:
   memory; and
   at least one processor coupled to the memory and, based at least in part on information stored in the memory, the at least one processor is configured to:
   receive a first indication of an association between the UE and an object;
   receive a sensing signal reflected off of the object associated with the UE;
   measure the received sensing signal reflected off of the object associated with the UE; and
   transmit a second indication of a broken association between the UE and the object based on the measured received sensing signal and the association between the UE and the object.

2. The apparatus of claim 1, wherein the at least one processor is further configured to:
   measure a strength of the received sensing signal, wherein, to transmit the second indication of the broken association, the at least one processor is configured to:
   transmit the second indication of the broken association in response to the measured strength of the received sensing signal being less than or equal to a signal strength threshold value.

3. The apparatus of claim 2, wherein, to measure the strength of the received sensing signal, the at least one processor is configured to:

measure at least one of a reference signal receive power (RSRP) or a relative RSRP backoff associated with the received sensing signal.

4. The apparatus of claim 2, wherein the at least one processor is further configured to:
receive the signal strength threshold value from a network node.

5. The apparatus of claim 2, wherein the at least one processor is further configured to:
receive a channel state information (CSI) reference signal (CSI-RS);
measure a second strength of the received CSI-RS; and
transmit a third indication of the broken association between the UE and the object in response to the measured second strength of the CSI-RS being less than or equal to a second signal strength threshold value.

6. The apparatus of claim 5, wherein the first signal strength threshold value and the second signal strength threshold value are different.

7. The apparatus of claim 1, wherein, to transmit the second indication of the broken association with the object, the at least one processor is configured to:
transmit at least one of an uplink control information (UCI) message, a sounding reference signal (SRS), a random access channel (RACH) message, or a medium access control (MAC) control element (MAC-CE) comprising the second indication of the broken association.

8. The apparatus of claim 1, wherein, to transmit the second indication of the broken association with the object, the at least one processor is configured to:
transmit a request to trigger a fallback beam management (BM) procedure.

9. The apparatus of claim 1, wherein, to transmit the second indication of the broken association with the object, the at least one processor is configured to:
transmit a request to construct a second association between the UE and at least one other object.

10. The apparatus of claim 1, wherein the at least one processor is further configured to:
receive a first channel state information (CSI) reference signal (CSI-RS) configuration comprising a third indication of a first periodicity;
receive a first CSI-RS from a network node;
receive an updated CSI-RS configuration comprising a fourth indication of a second periodicity, wherein the second periodicity is greater than the first periodicity; and
receive the sensing signal after receiving the updated CSI-RS configuration.

11. The apparatus of claim 10, wherein the at least one processor is further configured to:
receive a second CSI-RS based on the second periodicity:
measure the received second CSI-RS; and
transmit a CSI-RS report based on the measured received second CSI-RS.

12. The apparatus of claim 1, further comprising a transceiver coupled to the at least one processor, wherein, to receive the sensing signal reflected off of the object associated with the UE, the at least one processor is configured to:
receive, via the transceiver, the sensing signal reflected off of the object associated with the UE.

13. A method of wireless communication at a user equipment (UE), comprising:
receiving a first indication of an association between the UE and an object;

receiving a sensing signal reflected off of the object associated with the UE;
measuring the received sensing signal reflected off of the object associated with the UE; and
transmitting a second indication of a broken association between the UE and the object based on the measured received sensing signal and the association between the UE and the object.

14. The method of claim 13, further comprising:
receiving a first channel state information (CSI) reference signal (CSI-RS) configuration comprising a third indication of a first periodicity;
receiving a first CSI-RS from a network node;
receiving an updated CSI-RS configuration comprising a fourth indication of a second periodicity, wherein the second periodicity is greater than the first periodicity; and
receiving the sensing signal after receiving the updated CSI-RS configuration.

15. The method of claim 14, further comprising:
receive a second CSI-RS based on the second periodicity:
measuring the received second CSI-RS; and
transmitting a CSI-RS report based on the measured received second CSI-RS.

16. The method of claim 13, further comprising:
measuring a strength of the received sensing signal, wherein transmitting the second indication of the broken association comprises:
transmitting the second indication of the broken association in response to the measured strength of the received sensing signal being less than or equal to a signal strength threshold value.

17. The method of claim 16, wherein measuring the strength of the received sensing signal comprises:
measuring at least one of a reference signal receive power (RSRP) or a relative RSRP backoff associated with the received sensing signal.

18. The method of claim 16, further comprising:
receiving the signal strength threshold value from a network node.

19. The method of claim 16, further comprising:
receiving a channel state information (CSI) reference signal (CSI-RS);
measuring a second strength of the received CSI-RS; and
transmitting a third indication of the broken association between the UE and the object in response to the measured second strength of the CSI-RS being less than or equal to a second signal strength threshold value.

20. The method of claim 19, wherein the signal strength threshold value and the second signal strength threshold value are different.

21. The method of claim 13, wherein transmitting the second indication of the broken association with the object comprises:
transmitting at least one of an uplink control information (UCI) message, a sounding reference signal (SRS), a random access channel (RACH) message, or a medium access control (MAC) control element (MAC-CE) comprising the second indication of the broken association.

22. The method of claim 13, wherein transmitting the second indication of the broken association with the object comprises:
transmitting a request to trigger a fallback beam management (BM) procedure.

23. The method of claim 13, wherein transmitting the second indication of the broken association with the object comprises:

transmitting a request to construct a second association between the UE and at least one other object.

24. A non-transitory computer-readable medium storing computer executable code at a UE, the code when executed by at least one processor causes the at least one processor to:

receive a first indication of an association between the UE and an object;

receive a sensing signal reflected off of the object associated with the UE;

measure the received sensing signal reflected off of the object associated with the UE; and transmit a second indication of a broken association between the UE and the object based on the measured received sensing signal and the association between the UE and the object.

25. The non-transitory computer-readable medium of claim 24, wherein the code when executed by the at least one processor further causes the at least one processor to:

measure a strength of the received sensing signal, wherein, to transmit the second indication of the broken association, the code when executed by the at least one processor causes the at least one processor to:

transmit the second indication of the broken association in response to the measured strength of the received sensing signal-being less than or equal to a signal strength threshold value.

26. The non-transitory computer-readable medium of claim 25, wherein, the code when executed by the at least one processor further causes the at least one processor to:

receive a channel state information (CSI) reference signal (CSI-RS);

measure a second strength of the received CSI-RS; and transmit a third indication of the broken association between the UE and the object in response to the measured second strength of the CSI-RS being less than or equal to a second signal strength threshold value.

27. The non-transitory computer-readable medium of claim 24, wherein the code when executed by the at least one processor causes the at least one processor to:

receive a first channel state information (CSI) reference signal (CSI-RS) configuration comprising a third indication of a first periodicity;

receive a first CSI-RS from a network node;

receive an updated CSI-RS configuration comprising a fourth indication of a second periodicity, wherein the second periodicity is greater than the first periodicity; and receive the sensing signal after receiving the updated CSI-RS configuration.

28. An apparatus for wireless communication at a UE, comprising:

means for receiving a first indication of an association between the UE and an object;

means for receiving a sensing signal reflected off of the object associated with the UE;

means for measuring the received sensing signal reflected off of the object associated with the UE; and means for transmitting a second indication of a broken association between the UE and the object based on the measured received sensing signal and the association between the UE and the object.

* * * * *